May 10, 1949.  W. GREENE  2,469,723
FRAME MOUNTED AXIALLY COLLAPSING
TYPE TIRE REMOVING APPARATUS
Filed May 9, 1945  2 Sheets-Sheet 1
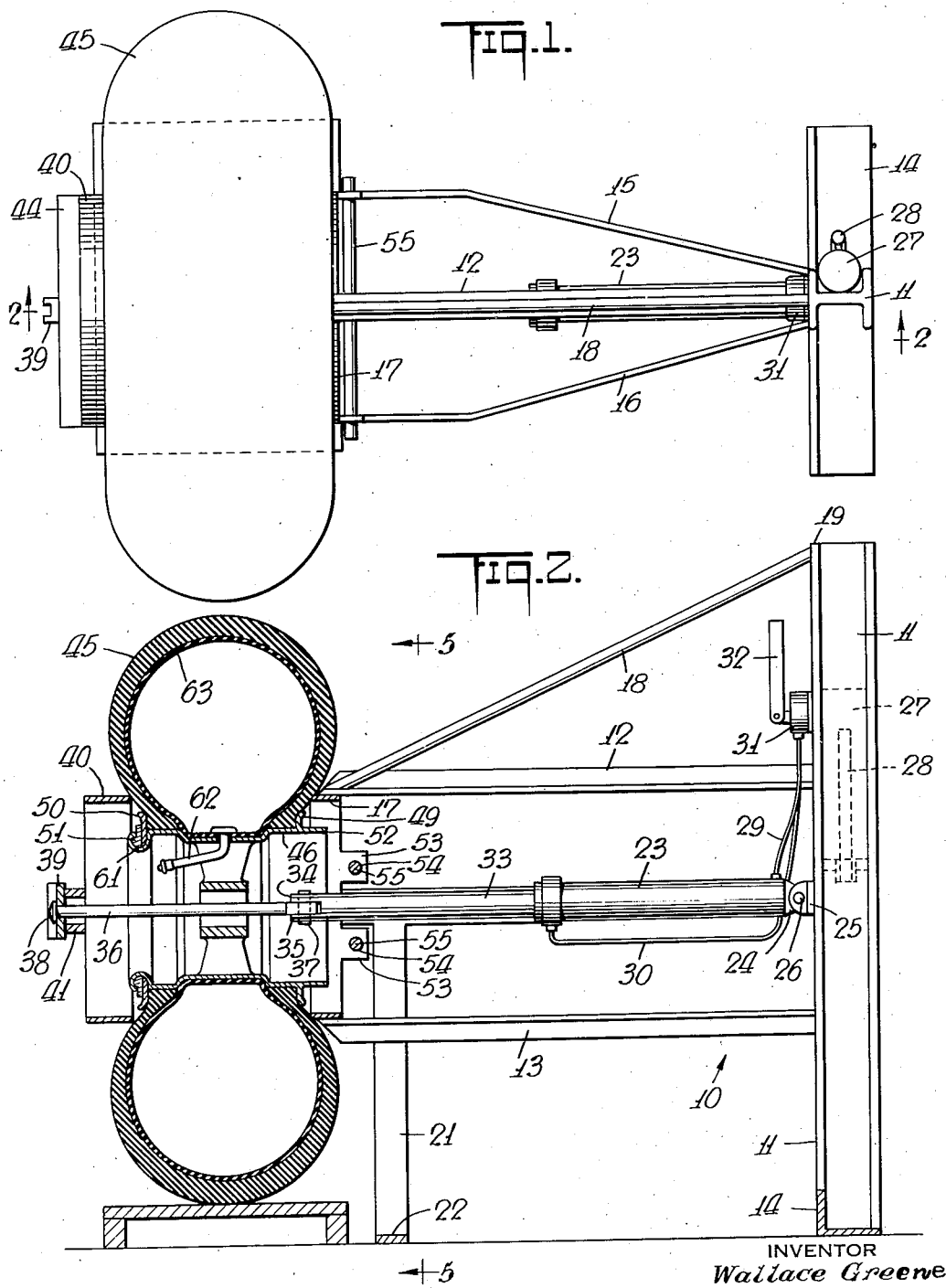
INVENTOR
*Wallace Greene*
BY
*his* ATTORNEY May 10, 1949.
W. GREENE
2,469,723
FRAME MOUNTED AXIALLY COLLAPSING
TYPE TIRE REMOVING APPARATUS
Filed May 9, 1945
2 Sheets—Sheet 2
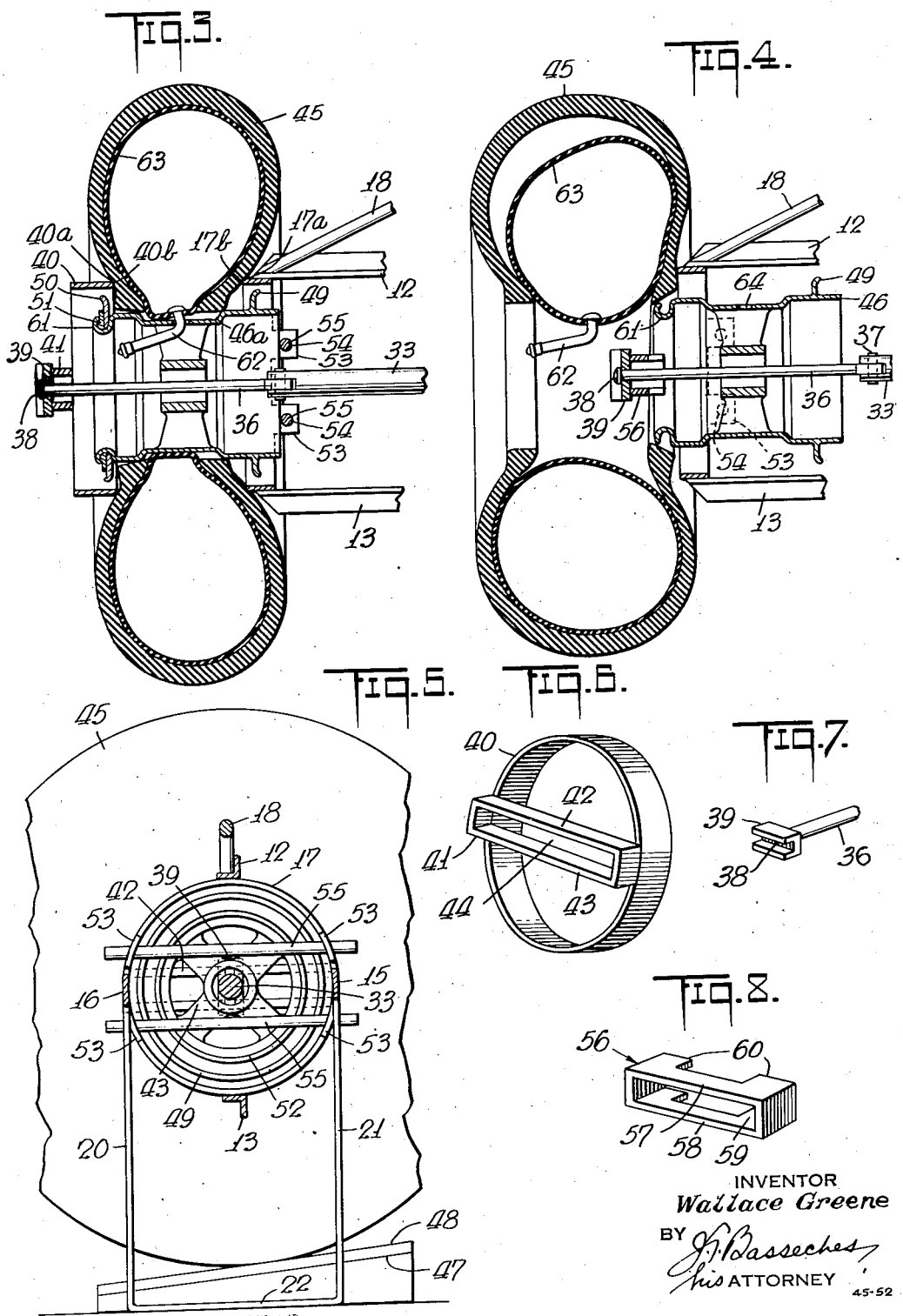
INVENTOR
*Wallace Greene*
BY *J. J. Basseches*
*his* ATTORNEY Patented May 10, 1949

2,469,723

UNITED STATES PATENT OFFICE 2,469,723

FRAME MOUNTED AXIALLY COLLAPSING TYPE TIRE REMOVING APPARATUS

Wallace Greene, New York, N. Y.

Application May 9, 1945, Serial No. 592,733

3 Claims. (Cl. 157—1.2)

This invention relates to a tire breaker and tire removing apparatus; more particularly, to an apparatus for separating the tire from its drum.

It is an object of my invention to facilitate the separation of a tire from its rim or drum, and more particularly to provide novel apparatus whereby the tire may be removed from its rim or drum by power driven apparatus which will minimize the manual labor involved in performing this arduous task. More specifically, it is an object of my invention to provide power driven apparatus for quickly and facilely breaking the side walls and beads of a tire from their engagement with the tire rim or drum, after use, to free the tire from intimate engagement with the rim or drum, and provide a convenient device for mouting a tire and drum or rim so that repair and replacement may be expedited.

Still more particularly, it is an object of my invention to provide apparatus for removing tires from their rims, particularly large, heavy tires, such as may be found on transport planes, to minimize the manual labor involved in performing the tire changing or repairing operations, and minimize the time required for the same.

To attain these objects, and such further objects as may appear herein or be hereinafter pointed out, I make reference to the accompanying drawing forming a part hereof, in which—

Figure 1 is a plan view of my device with the tire in position;

Figure 2 is a section taken on the line 2—2 of Figure 1;

Figure 3 is a fragmentary sectional view corresponding to Figure 2, with the apparatus in one position thereof;

Figure 4 is a fragmentary sectional view corresponding to Figure 2, with the apparatus in another position thereof;

Figure 5 is a section taken on the line 5—5 of Figure 2;

Figures 6, 7 and 8 are perspective views of details of the apparatus.

Making reference to the drawings, my invention contemplates, in its preferred embodiment, the provision of apparatus to perform steps heretofore largely effected manually, in order to repair and change tires, especially those tires used on large transport airplanes. The steps involved after removal from the vehicle of the tire with its drum or rim is to attempt to break or loosen the tire beads from the drum by forcing them with a tire iron and rubber hammer down towards the center of the rim. After the tire beads have been broken loose, it is customary to attempt to pry one of the tire rims loose and using a tire iron, work the locking rim loose progressively around the wheel. After removing the locking rim and pulling away the removable side flange from the wheel or drum, where such construction is encountered, the valve stem is pushed through the valve hole of the wheel drum, and then an attempt is made to remove the wheel or drum from the tire.

With huge tires of some 15" or more across the tread, this operation is exceedingly arduous, especially as to the effort necessary to break the tire beads loose from the rim or drum, and to pull the rim or drum from the tire.

My invention contemplates the simplification of these operations and the employment of power driven means to accomplish the series of steps with facility and speed while avoiding injury to the tire.

Making reference to the drawing, I show a frame 10, comprising an upright 11, from which are disposed horizontal braces 12 and 13, the ends whereof are welded or riveted to the upright 11. The upright 11 is affixed to the base 14, extending to either side thereof to stabilize the structure. Side braces 15 and 16, cooperate with the braces 12 and 13 to form a spider assembly for a ring 17, affixed to the free ends of the braces 12 and 13, and side braces 15 and 16. An angle brace 18 is disposed from adjacent the head 19 of the upright 11, immediately above the ring 17 adjacent the free end of the brace 12.

The forward end of the spider assembly for the ring 17 is supported by seats 20, 21, connected at the base by the cross bar 22.

Axially of the spider supporting the ring 17, I provide a hydraulic jack 23, the end of which 24 is connected to the bracket 25 by the cross pin 26. In one embodiment of my invention, I provide a pumping unit 27, comprising a reservoir and hand pump 28, feeding the hydraulic jack 23 by the conduits 29 and 30 through the medium of the selector valve 31, controlled by the selector handle 32. The conduits 29 and 30 feed the hydraulic fluid to the bottom and top of the plunger (not shown) for expansion and retraction of the connecting rod 33, in a manner well understood, the details of which need not here be described.

The connecting rod or piston rod 33 has its free end provided with knuckles 35, for holding the extension rod 36 by a cross pin 37. The extension rod 36, at its free end 38, is directed through a cross bar 39 generally of a channel construction, over the base flange of which the extension 36 is headed, permitting rotation of the cross bar 39.

With this assembly, there is provided a pressure ring 40, whose diameter is generally substantially the same as the ring 17 and depending upon the size of the drum upon which the tire is mounted. The ring 40 is provided with a brace 41 substantially diametrically thereof and comprising spaced ribs 42 and 43, providing a slot 44 of a size to receive the cross bar 39 along its narrow dimensions.

The length of the cross bar 39 is of a size such as may pass through the hub opening of the rim, drum or wheel as will be more clearly apparent as this description proceeds.

With this installation thus far described, I will describe the manner of using my device.

A tire 45, with its drum 46, after removal from the axle of the vehicle, such as an airplane, is rolled in position to locate the drum 46 concentrically with the ring 17. For this purpose, I may provide a platform 47, whose upper surface 48 is inclined. The purpose of the platform 47 is to raise or lower the tire 45, depending upon the condition of inflation of the tire. A softer tire or less inflated tire may require greater elevation than a tire having greater pressure. Further extension of the platform may be resorted to, to accommodate tires of different sizes.

The tire is rolled in position so that its fixed or permanent flange 49 is adjacent the ring 17, to locate the removable rim 50 and locking ring 51 outwardly. The size of the ring 17 is chosen just to clear the flange 49 and the size of the ring 40 is similarly chosen to clear the removable flange 50.

In the position as shown in Figure 2, and with the tire therein illustrated, the drum or rim 52 is availed of to act as a stop engaging position as will appear herein. In the position shown in Figure 2, the ring 17 is provided with ears 53, orificed at 54, to receive removable cross bars 55.

In this position, the selector 32 is actuated to operate the hydraulic pump, to project the connector 33 and the extension 36 outwardly and direct the cross bar 39 through the openings of the hub of the wheel. Thereupon, the ring 40 is placed in position to span the removable flange of the drum, and the cross bar 39 is turned sidewise to pass through the slot 44 of the cross bar 41 formed by the webs 42 and 43. After passing through the slot 44, the cross bar 39 is turned substantially at right angles to the webs 42 and 43 as shown in Figure 2. In this position, the selector 32 is set to operate in the reverse direction, to retract the connecting rod 33, and the extension rod 36 carried thereby. This movement of the rod is continued until it draws the rings 17 and 40 toward each other, until the rim 52 engages the cross bars 55 at the rear and the cross bar 41 engages the flange at its front bead 61 to restrain further movement of the drum 46. Under this set of operating conditions, the rim 17a of the ring 17 and the rim 40a of the ring 40 are directed to engage the side walls 17b and 40b, respectively, of the tire adjacent the beads, to break the beads away from the flanges 49 and 50, respectively. This is more clearly shown in Figure 3.

It will be observed that the bars 55 act as removable abutments for the drum while the ring 17 breaks the bead from the flange of the inner side of the tire. Likewise, the cross bar 41 acts as an abutment for the drum when the ring 40 breaks the bead from the flange on the outer side of the tire. Should the inner bead break first, the continued movement of the plunger 33 draws the drum into engagement with the rods 55 without breaking of the outside bead from its flange, whereupon, when the drum is held against further movement, the ring 40 engages the outside bead of the tire. Should the movement of the plunger serve to effect breaking of the outside bead first, the movement of the ring 40 progresses to the point where the cross bar 41 engages the clincher bead 61, moving the drum inwardly with the tire against the ring 17.

With the tire held in this position, the beads tend to rise within the depression 46a of the periphery of the drum, completely loosening the tire 45 from the drum and minimizing the tendency of the beads to reassume the spread condition.

With this portion of the bead breaking operation accomplished, the cross bar 39 is projected outwardly by the pneumatic pump mechanism until it may be turned from its cross wise position engaging position shown in Figure 3, to the point where it may be turned and brought into parallelism with the slot 44. This permits removal of the ring 40. Thereupon the locking ring 51 may be removed, and thereby to permit removal of the outside removable flange 50.

I apply some dry lubricant to the exposed bead of the drum using talcum powder, soap solution or like lubricant, to minimize the force necessary to pull the drum through the front bead in the first pulling operation, and finally through the rear bead in the final operation as hereafter described.

I then axially position a "puller" bar 56 over the cross bar 39 and this comprises cross member 57 and 58, defining a slot 59, and having seats 60, 60, spaced apart merely to engage the clincher bead 61, and accordingly smaller than the opening in the tire concentrically of the bead of the tire. The "puller" bar is arranged cross-wise diametrically over the drum, centrally and in this position the cross bar 39 is directed into the slot 59 and then turned cross-wise, as shown in Figure 4. The rods 55 are then removed, and the selector handle 32 is adjusted for retracting the drum. The retraction operation is continued to the point where the bead 40b only is exposed, tending to tilt the valve stem 62, carried by the inner tube 63 in the valve stem opening 64 in the drum 46. When the bead 40b projects over the clincher flange 61, the hand may be inserted inside the carcass to slide a fishing tool carried by a chain over the valve stem 62, thereby to pull the valve stem through to the inside of the tire and through the valve stem hole 64.

The hydraulic mechanism is then again operated to pull the drum out completely from the casing.

While I have shown and described hand pumping mechanism to apply pneumatic force to the connecting rod or plunger 33, and prefer the same, other methods of applying this magnified force may be employed.

While with tires of the size 15" at the widest portion have been successfully released at the beads and withdrawn from the tire casing, using a unit which supplies 1200 to 2000 pounds pressure as derived from a hand pumping unit and reservoir and a 30,000 pound jack, electrically driven pumping means may be employed instead of hand pumping, with suitable transmission gears and regulators in place of the hand pumping unit.

It will be understood that while the rings 17 and 40 are selected as to size with the particular tire casing shown, I may, with the same installation, interpose substantially smaller adapter rings to meet the contingency that smaller tires may be required to be handled by the same equipment.

For smaller tires, the platform 47 may be modified to compensate for the difference in size of the units to be handled extending the length of the inclination to concentrically position the rim or drum with respect to the particular ring 17 and tire under consideration.

It is to be understood that while I have shown the cross bar 39 larger than the hub opening, requiring that the cross pin be removed to connect the extension rod 36 to the knuckles 35, it will be understood that where the hub opening is larger or the tire is mounted upon a rim this procedure need not be adapted. Likewise the cross bar 39 may be arranged for quick attachment and detachment to the extreme end of the rod 36 by other means to serve my purpose.

It will be observed that my invention minimizes the manual force necessary to position the tire in position as it may be simply rolled into close adjacency to the drum pulling apparatus for this operation. Additionally, by "breaking" both beads simultaneously from the inner and outer flanges, and the use as in the preferred form of rings a more efficient loosening action is procured to expedite the tire repairing operation without endangering the tires to be dismounted.

Having thus described my invention and illustrated its use, what I claim as new and desire to secure by Letters Patent is:

1. In an apparatus for breaking the beads of a tire from the flanges of a drum or the like upon which the tire is mounted comprising in combination, an upright frame, ring supporting means extending horizontally from said frame, a ring for engaging the inner bead of said tire adjacent the drum flange, said ring being supported in spaced relation to said upright frame, a second and opposed ring for engaging the outer bead of said tire adjacent the drum flange, power driven means on said frame having an axially movable stem arranged to extend through said rings and the hub of said drum, a removable cross member at the free end of said stem adapted to span said second ring whereby drawing of the rings toward each other by said power driven means will cause the beads of the tire to be simultaneously engaged between said rings, and removable stop means in back of said first mentioned ring for engaging said drum and limiting its movement, to effect breaking of the beads from opposed drum flanges.

2. In an apparatus for breaking the beads of a tire from the flanges of the drum in accordance with claim 1 wherein said ring supporting means comprises a plurality of spaced arms between which the power driven means is positioned and the ends of which arms peripherally support said inner bead engaging ring, and said inner ring including ears for removably receiving cross bars chordally extending over said ring and providing the said removable stop means.

3. In an apparatus for breaking the beads of a tire from the flanges of a drum or the like upon which the tire is mounted, comprising in combination, a frame, ring supporting means extending substantially normally from said frame, a ring for engaging the inner bead of said tire adjacent the drum flange, said ring being supported in spaced relation to said frame on said ring supporting means, a second and opposed ring for engaging the outer bead of said tire adjacent the drum flange, power driven means on said frame having an axially movable stem arranged to extend through said rings and a hub of said drum, a removable cross member at the free end of said stem adapted to span said second ring whereby drawing of the rings toward each other by said power driven means will cause the beads of the tire to be simultaneously engaged between said rings and removable stop means in back of said first mentioned ring for engaging said drum and limiting its movement to effect breaking of the beads from opposed drum flanges.

WALLACE GREENE.

REFERENCES CITED

The following references are of record in the file of this patent:

UNITED STATES PATENTS

| Number | Name | Date |
|---|---|---|
| 1,724,813 | Weaver et al. | Aug. 13, 1929 |
| 2,034,819 | Maulis | Mar. 24, 1936 |
| 2,199,162 | Oliva | Apr. 30, 1940 |
| 2,281,476 | Casey | Apr. 28, 1942 |
| 2,333,880 | Ohlsen | Nov. 9, 1943 |
| 2,373,975 | Plumeau et al. | Apr. 17, 1945 |
| 2,375,956 | Smith et al. | May 15, 1945 |
| 2,418,849 | Polt | Apr. 14, 1947 |

OTHER REFERENCES

"Aviation" Magazine, page 157, issue of April 1945.